2,858,226

TOMATO JUICE DEHYDRATION PROCESS

Vern F. Kaufman, Lafayette, Roger M. Reeve, Berkeley, and Francis F. Wong, Oakland, Calif., assignors to the United States of America as represented by the Secretary of Agriculture No Drawing. Application April 17, 1956
Serial No. 578,847

8 Claims. (Cl. 99—206)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to the dehydration of tomato juice. The objects of this invention concern the provision of processes for dehydrating tomato juice whereby to obtain solid dried products which are characterized by many advantageous properties. Thus the products are in the form of free-flowing crystalline granular particles which do not gum nor coalesce when exposed to air for reasonably long periods of time but retain their free-flowing characteristics; the particles have an expanded, porous, sponge-like structure whereby they exhibit a high rate of rehydration when stirred with water to prepare a reconstituted juice; and the products retain essentially all the flavor and nutritive value of the original juice so that the reconstituted juice prepared from the dry products tastes essentially the same as the freshly prepared juice and has the same content of vitamins and other nutritive values.

A particular object of the invention is the provision of methods whereby to ensure extensive expansion of the tomato material during dehydration and to ensure the maintenance of such an expanded state during the course of the dehydration whereby to obtain a rapid rate of dehydration and to obtain a porous product having the properties noted above. A specific object of the invention concerns the application of dehydration to liquid tomato material which has such characteristics that when subjected to dehydration under conditions of heat and vacuum, it will expand extensively and retain such an expanded state during the course of the dehydration whereby to produce a dehydrated product having the above-noted desirable characteristics. Further objects, advantages, and features of the invention will be evident from the following description.

In the patent application of S. I. Strashun, Serial No. 291,817, filed June 4, 1952, now abandoned, there is disclosed a process for dehydrating orange juice and other fruit and vegetable juices. This process, which has come to be known as puff-drying, involves concentrating the juice and then dehydrating the liquid juice concentrate by maintaining it in contact with a heated surface while it is exposed to vacuum. During the dehydration, heat is applied at a controlled rate so that the concentrate puffs or expands to an extensive degree and maintains this expanded condition throughout the dehydration. By obtaining and maintaining this expanded condition, many desirable results are achieved. In the first place, the dehydration takes place rapidly because moisture can readily diffuse out of the porous mass. The rapid evaporation of moisture exerts a pronounced cooling effect so that the concentrate does not suffer any heat damage during the dehydration. A third point is that the product has very desirable properties. Thus the product is a porous mass which is easily broken up into small particles or flakes which are free-flowing and which exhibit an extremely high rate of rehydration so that a reconstituted juice can be prepared by agitating with water for less than one minute. This process has been applied on a commercial scale by a Florida concern for production of dehydrated orange juice.

It has been observed that when puff-drying technique of the aforesaid Strashun application is applied to tomato juice, good results are not generally achieved in that the tomato juice concentrate does not expand properly during dehydration. In most cases the tomato juice concentrate will expand initially but during the course of the dehydration it will collapse. As a result the dehydration is unsatisfactory in that the dehydrated product is a tough leathery mass which is virtually impossible to remove from the dehydrator trays, which resists breaking into pieces and which cannot be rehydrated even after stirring with water for 15 to 30 minutes or longer.

Intensive laboratory investigations have shown that the character of the tomato liquid which is applied to the dehydration procedure is a critical factor in the success or failure of the dehydration. Thus if the tomator liquid applied to the puff-drying procedure has the proper chemical and physical attributes the dehydration will be successful in that the tomato liquid will expand to an extensive degree and will maintain this expanded condition throughout the course of the dehydration thus enabling the production of a product having the desirable properties of being in a friable, porous state and exhibiting a high degree of rehydration. On the other hand a tomato liquid lacking in these characteristics will not dehydrate properly in that it will form a tough, leathery mass which is virtually impossible to rehydrate. It has been found further that the proper chemical and physical attributes of the tomato liquid are dependent on the manner in which the liquid is prepared from raw tomatoes. Thus to achieved successful dehydration, it is requisite to prepare the tomato liquid in the manner as described and explained hereinafter.

Our researches indicate that pectin content is a critical factor in the performance of a given tomato juice in the puff-drying procedure with which this invention is concerned. Thus where the tomator juice retains its normal content of pectin in the native and chemically unaltered state, the tomato juice will behave satisfactorily during dehydration, that is, it will expand to an extensive degree and maintain such expanded state throughout the course of the dehydration. On the other hand, if the tomato juice is deficient in pectin or if the pectin contained therein has been chemically altered, the juice will not operate satisfactorily in the dehydration in that it will expand only to a minor degree and even if it does expand, it will eventually collapse in volume forming a dense, leathery product. By applying the principles of this invention one is enabled to prepare tomato juice having its natural proposition of pectin in a native, chemically unaltered state and by applying the puff-drying procedure to this juice one is assured of obtaining and maintaining expansion during dehydration with the production of a dried product having the desirable properties listed above. Since pectin plays a prominent role in the procedures with which this invention is concerned, the following explanation of pectin chemistry is apropos.

Pectin is a colloidal carbohydrate material which occurs in most forms of plant life. Chemically, pectin is a polymer of galacturonic acid wherein most of the carboxyl radicals are esterified by methyl groups. Actually, pectin is not a single individual compound like water or salt but varies in several respects particularly molecular weight and degree of esterification depending, for example, on the plant material in which it occurs and the method employed for extracting it from the plant material. The pectin molecule can be readily altered by the influence of such agencies as acids, alkalis, heat, and enzymes, such alteration causing either degradation, demethoxylation, or both of these. By degradation is meant decrease in molecular weight so that the degraded pectin contains a fewer number of anhydrogalacturonic acid units in the chain than the original pectin. An undegraded or high-molecular weight pectin is characterized by exhibiting a high viscosity in solution and by a high jelly grade, that is, a small amount of the pectin will cause jellying of a standard amount of sugar, on the order of 1 lb. of pectin for 200 lbs. of sugar. When pectin is subjected to degradative conditions pectins of decreasing viscosity and lowered jelly grade are produced and eventually a polygalacturonide having no colloidal properties is produced. Such a material has no jellying power whatever. In demethoxylation, the carbomethoxy groups in the pectin molecule are hydrolyzed to carboxyl radicals. Intensive de-methoxylation produces low-methoxyl pectinic acids and eventually pectic acid which is virtually free from methoxyl groups. The low-methoxyl pectinic acids and pectic acid, unlike pectin, do not form gels with sugar but require the presence of calcium ions to form gels.

In the puff-drying process, a complex pattern of conditions must exist in order to achieve and maintain expansion of the material undergoing dehydration. Thus at the beginning of the process, the material must be fluid enough so that when bubbles of gas (steam or air) are formed, the individual particles of material may move away from one another to accommodate these gas bubbles and thereby permit the material en masse to increase in total volume. At the same time the material must exhibit the requisite properties of viscosity or stickiness or thickness so that the bubbles of gas will be enmeshed in the mass and these bubbles will not simply move up and out of the material. To illustrate by analogy—a piece of wood will not expand under influence of heat and vacuum because it is a solid and formation of steam bubbles cannot move apart the individual particles which make up the piece of wood. Also a solution of salt will not expand under these conditions because the steam bubbles will simply pass up through the body of liquid. Further, as the dehydration progresses the material must progressively become thicker and eventually assume a stiff plastic condition so that as steam diffuses out of each bubble it will leave behind a spherical void surrounded by a matrix of the material undergoing dehydration. Naturally if the material remains in a fluid state, collapse will occur as steam diffuses out of the material into the vacuum system. Where the tomato liquid contains its natural proportion of pectin in the native, chemically unaltered state, the proper pattern for successful puff-drying is present. Thus at the start of the process, the native, high-molecular pectin gives the tomato liquid a unique character which may be described as thick, sticky, pasty, or gluey so that when the vacuum and heat are applied the tomato material expands into a foam-like mass as the tomato material entangles and enmeshes the bubbles of steam and/or air which form within the mass. These bubbles cannot readily escape from this mass because of the gluey nature of high-molecular weight pectin in the tomato mass. As the dehydration continues, the mass becomes increasingly thick assuming a stiff plastic condition which prevents collapse of the foam-like mass formed in the original expansion when the mass still had liquid properties. Thus as the dehydration proceeds, the sugar concentration in the tomato material increases and under such conditions the pectin forms gels of increasing rigidity which in turn cause the progressive stiffening of the mass. On the other hand, where the tomato material does not contain its normal proportion of pectin in the native, chemically unaltered state such successful results cannot be achieved. Thus with such material, the initial expansion does not occur to any practical degree because the pectin does not have the ability to give the tomato material the glueyness needed to enmesh the bubbles of gas and the bubbles move up and out of the mass. If any expansion does occur, the mass eventually collapses because the pectin does not impart to the mass enough stiffness to hold the expanded condition as moisture diffuses from the mass.

It is particularly to be noted that a batch of tomato juice which is not adapted for successful puff-drying cannot be aided in this respect by dissolving pectin therein prior to application of the dehydration procedure. In this regard we have obtained batches of tomato juice which had been prepared in such manner that the pectin therein was subjected to degradation. Such tomato juice did not puff-dry properly even when a standard pectin sold for jelly making purposes was incorporated therein. It is believed that two factors are involved in the inability of added pectin to give the tomato juice good drying characteristics. In the first place, pectins which have been isolated from plant sources are not actually the same as the pectin originally in the plant material. Conventionally pectin is isolated by extracting plant material (citrus peels, apple pomace, etc.) with warm acidulated water. Under these conditions and even when carefully controlled and performed, a certain degree of demethoxylation occurs so that the recovered pectin has a lowered molecular weight and lowered methoxyl content as compared with the pectin in situ in the plant material. Also in the plant material, the pectin does not exist entirely as such but in chemical or physical association with other substances to form a water-insoluble complex generally known as protopectin. The non-pectin moiety of protopectin has been variously characterized by different investigators as cellulose, araban, alkaline-earth metal cations, or proteins. In the pectin extraction process the protopectin complex is of course decomposed into the pectin and non-pectin moieties. A second point is that the pectin in situ in tomato material occurs mostly as a viscous film about individual cells in the tomato tissue. Thus when tomato juice is prepared in such manner as to retain the pectin in native form, the pectin exists mostly as a viscous film about each cell of tomato tissue, these coated cells being suspended in the watery (serum) phase of the juice. It is believed that this viscous gluey film of pectin about the cells is the important factor in the ability of a properly prepared tomato juice to enmesh and entangle bubbles of gas and thus expand in volume when the dehydration is initiated. Where pectin is incorporated into a pectin-deficient juice such a situation as above described cannot be achieved. The added pectin merely dissolves in the watery (serum) part of the juice and does not form a thick pectin coating about the tomato cells. As a result such a "doctored" juice will not expand properly when subjected to the puff-drying treatment. Even if it does expand initially, it will collapse during the course of the dehydration.

To prepare a tomato juice having the proper characteristics for successful puff-drying a key factor lies in the step of inactivating the enzyme content of the raw produce before the enzymes naturally present therein can effectuate degradation and/or demethoxylation of the native pectin. Thus tomatoes are particularly rich in the enzymes which are responsible for pectin de-methoxylation and degradation, namely, pectin-methylesterase which causes de-methoxylation and pectin-polygalacturonase and pectic acid-depolymerase which cause degradation of pectin. If the tomato material is allowed to stand for an appreciable length of time after the natural tomato organization has been disrupted (as by cutting, crushing or other form of comminution or application of heating sufficient to break down tissue structure without enzyme inactivation or by application of freezing), these enzymes will cause chemical alteration of pectin and the juice eventually prepared from this tomato material will not perform successfully in the puff-drying procedure. However, one of the features of the process of this invention is that no opportunity is afforded for the enzymes to attack the pectin in the tomato material because the enzymes are inactivated by application of heat before any significant amount of enzyme-catalyzed pectin alteration can take place. As a result, the tomato juice so prepared from this material contains its natural content of native, chemically unaltered pectin and it performs admirably when subjected to puff-drying, yielding a friable, free-flowing, porous product of extremely high rehydration properties.

In addition to pectin content, another factor of importance in the dehydration process is the physical state of the cellular material in the tomato juice. Thus, depending on how the juice is prepared, it may contain whole cells suspended in the serum or it may contain fragmented cells or aggregates of cells suspended in the serum. It has been found that when the cellular content of the juice consists for the most part of intact, individual, disconnected cells, the dehydrated product exhibits an especially high rate of rehydration. Thus when it is mixed with water it disperses rapidly and forms a homogeneous juice which has the texture of freshly prepared tomato juice. On the other hand, where the cellular content of the juice is largely in the form of ruptured cells or aggregates of cells, the dehydrated product does not exhibit optimum rehydration qualities. Thus when the product is stirred with water it disperses relatively slowly and the resulting juice contains a greater or lesser percentage of undispersed particles which quickly settle out of the juice. Therefore to obtain a dehydrated product which exhibits optimum rehydration properties it is preferred that the cellular material in the juice which is applied to the puff-drying procedure consist for the most part of intact, individual, disconnected cells. To obtain a juice of such cellular content, the tomato material is disintegrated mostly by the action of heat rather than by mechanical action. Thus when heat is applied to tomatoes the mucilaginous material in the interstices between the cells is softened and the cells become separated from one another without an excessive proportion of the cells being ruptured. The resulting juice contains the serum with the intact, disassociated cells suspended in it. On the other hand, where the raw tomato material is formed into a juice by forcing it through fine apertures, considerable cell rupture occurs because of the mechanical stresses involved and the resulting juice has a high content of ruptured cells and aggregates of ruptured and intact cells. Specific methods of disintegrating the tomato material mainly by the action of heat to obtain a juice which forms a dehydrated product of optimum rehydration characteristics are described hereinbelow, in detail. In these operations the disintegration of the tomatoes is primarily caused by thermal action and in the substantial absence of cell-rupturing mechanical forces. Some degree of mechanical action is usually required for practical operations. Mechanical action such as cutting or chopping causes little damage to the bulk of the cells. Crushing or screening to remove seeds and skins, particularly after application of steam to soften the tomato tissue, also is permissible as causing only a minor amount of cell damage. However the application of excessive pumping, forcing of the cold tomato material through fine apertures and other treatments which are conducive to cell rupture should be avoided.

Another advantage of keeping the cells in the juice intact is explained as follows: As noted above it is necessary to heat the tomato material in order to inactivate pectic enzymes. This heating results in a denaturation of the proteins naturally present in the tomato cells. These denatured proteins exhibit anti-foaming properties in contrast to the native proteins which exhibit foaming properties. By making sure that the cells remain intact, these denatured proteins remain within the cells and thus cannot exert any anti-foaming action in the mass of tomato material during aeration or puff-drying. As a result, the tomato material forms stable foams and dehydrates properly, that is, it forms an expanded, porous dry product. On the contrary, in situations where the cells are ruptured, denatured proteins are released into the body of tomato material and as a result stable foams cannot be produced—the eventual result is that the tomato material will not puff on dehydration but will dry down to a dense, horny mass. Also, where the denatured proteins remain within the cells, the dehydrated product has better rehydration properties in that a reconstituted juice can quickly be produced on mixing with water. On the other hand, where the denatured proteins have been released from the cells, the dehydrated product has very poor rehydration qualities.

In view of the above considerations, it is evident that for best results in the dehydration the cellular portion of the tomato liquid should contain a maximum proportion of individual, whole, disconnected cells. Theoretically this proportion would be 100%. In practical operations such a value cannot be achieved because no matter how carefully the tomatoes are processed, some cell rupture will take place. However, following the detailed procedures set forth below one can readily obtain liquids of which the cellular portion contains 70% or more of whole cells. Such liquids display excellent performance in the puff-drying procedure. In many cases it has been observed that good dehydration characteristics are displayed by tomato liquids whose cellular portion contains as low as 40 to 50% of individual, whole, disconnected cells. The preparation and use of such liquids is considered as coming within the ambit of this invention since for practical purposes such liquids come within the category of those having their cellular content largely in the form of individual, whole, disconnected cells.

Modes of operation within the scope of this invention are set forth below in greater detail:

A. Preparation of juice

A preferred plan of operation to prepare the juice involves the following steps: Raw tomatoes are cut into pieces (for example, halves, quarters, or eighths) and the cut tomatoes are immediately subjected to a heating step which is adapted to quickly bring the temperature of every particle of tomato material to the enzyme inactivating level and to cause disassociation of the cells of the tomato tissue. This heating step may be accomplished in this manner: A tank filled with a large volume of tomato juice from a previous run is maintained at about 180 to 212° F. The cut tomatoes are directly fed into the tank of hot juice at such a rate that the heating system can maintain the mass of juice and tomatoes at about the said temperature level. Continuous agitation is applied in the tank to ensure good contact of the raw tomato particles with the hot juice. The heat-treated juice formed from the cut tomatoes may be withdrawn from the tank continuously or in batches. In any case, enough juice is left behind to serve as the heating medium for the incoming raw tomatoes. In this technique a very rapid heating rate is obtained because small increments of raw tomato material are introduced into a large volume of the hot juice. Thus each piece of tomato material is surrounded with a pool of hot medium and heat transfer takes place rapidly and the entire volume of each piece of tomato is brought up to the temperature of the juice in a very short period of time, usually a minute or less. Baffles, compartments, or other suitable mechanisms may be provided to ensure retention of each particle of entering tomato material in the hot juice for a residence time sufficient to ensure complete enzyme-inactivation and complete disassociation of the tomato tissue into individual, disconnected cells. The time of residence may vary from about 1 to 15 minutes, depending on such factors as the temperature of the juice in the tank, temperature of the raw tomatoes, degree of subdivision of the tomatoes, maturity of the tomatoes, etc. In any particular case, the adequacy of the heat treatment can be determined by testing the treated juice for the presence of active enzymes and by microscopic examination for proper cell disassociation.

The juice removed from the tank is then subjected to screening to separate seeds, skins, pieces of core and other undesirable material.

In the procedure as above outlined the raw tomatoes are subjected to cutting before being introduced into the tank of hot juice. This cutting action causes some degree of cell rupture but has the advantage that a size reduction is obtained so that the time required to transfer heat to the center of each piece of tomato is much less than it would be were the whole tomatoes introduced into the tank. Also, the cutting action affects only a minor proportion of the total cells in the tomatoes so that it has a minor effect on the quality of the final dehydrated product. If desired, the raw tomatoes can be introduced whole into the tank of hot juice although in such case the heating time will have to be unduly prolonged. Another plan of operation involves subjecting the raw whole tomatoes to direct contact with steam for a short period of time to soften them. The resulting softened tomatoes can then be crushed or otherwise disintegrated with little damage to individual cells. The disintegrated material is then introduced into the tank of hot juice and processed as described above.

Another plan of operation involves first reducing the tomatoes to juice and then subjecting this juice to a heat treatment step. Procedures of this character are described below:

Raw tomatoes are cut into pieces then passed through a device commonly referred to as a pulper or paddle-finisher wherein the tomato pieces are subjected to the action of rotating paddles which break up the tomatoes into a macerate. The paddles then force this macerate through a screen having openings on the order of 0.02 inch to separate the juice from the skins, cores, seeds, etc. In order to avoid rupture of the tomato cells the device should be adjusted to get what is termed in the industry a light press. This signifies that the pressure between the paddles and screen is so adjusted that only about 70–75% of the weight of the tomatoes is forced through the screen as juice. This is in contrast to a heavy press, usually used in making tomato paste products, where as much as 95% of the tomato material is forced through the screen. To further reduce the amount of mechanical stress which needs to be applied to the tomato material thereby to reduce the degree of cell rupture, it is preferred to apply steam or other hot medium to the tomatoes before or during the pulping and screening steps. Such steaming softens the tomato tissue so that the material passes through the apparatus more readily and hence with less damage to individual cells.

The juice obtained as described above is then passed through a heat exchanger of the type which enables the temperature of the juice to be rapidly brought up to an enzyme-inactivating level of about 180° to about 220° F. To ensure substantially complete destruction of enzymes it is preferred to hold the juice at such elevated temperature for a period of time from about 5 seconds at the higher temperatures in the above range to about 5 minutes at the lower temperature in the above range. The heat exchanger may be, for example, of the type in which the juice is forced between two heated walls maintained a very small distance apart so that every particle of the juice is almost instantaneously brought up to the desired temperature. Devices may also be used which provide a rotating blade which continuously applies a thin film of the juice onto a hot surface and continuously removes and discharges the heated juice. Another type of apparatus which may be used is a steam injector heater alone or coupled with a tubular heater as disclosed by T. Wasserman and M. E. Lazar, Patent No. 2,625,488, and A. H. Brown, P. W. Kilpatrick, and M. E. Lazar, Patent No. 2,636,430. In these devices the juice is mixed under turbulent flow conditions with steam and the juice rapidly brought up to a temperature at which enzyme inactivation takes place. Where direct heating with steam is used, a certain amount of dilution of the juice will take place but this added moisture is readily removed in the subsequent concentration step. Other devices which are adapted to heat juices rapidly and uniformly are known in the food processing art and may be used. In any event the main point to be observed is that the procedure and the apparatus should be so selected that the period from the moment the tomato structure is disorganized to the moment when the juice is brought to an enzyme-inactivating temperature is very short so that no substantial degree of pectin alteration can occur. For optimum results, this period of time should not be over 30 seconds. In some instances a delay period of up to about 10 minutes can be tolerated especially where the juice is kept at room temperature or below prior to heating but the product will exhibit a lesser degree of expansion and a lesser degree of porosity than the product produced from a juice which has been heat-inactivated without delay. Thus to produce a product of optimum characteristics from the standpoint of expansion, porosity, friability, and ease of rehydration it is preferred that after the raw tomatoes have been cut, crushed or otherwise disintegrated they be immediately subjected to enzyme inactivation by heating. In the enzyme inactivation step one should avoid the use of heating systems wherein a large mass of tomato material in a vessel, at say room temperature, is subjected to heat through the use of a steam jacket about the vessel or similar heating means. In such case a considerable time will elapse before the relatively cool mass of tomato material actually reaches the enzyme-inactivating temperatures and considerable pectin degradation will have taken place in the interim.

It is evident from the above description that the operations required to reduce the raw tomatoes to a juice of the proper characteristics can be carried out in any order. The raw tomatoes may be first reduced to a juice then subjected to heat to inactivate the enzymes, or, these operations can be carried out in inverse order. Also, the raw tomatoes can be subjected to heating to simultaneously reduce them to juice and to inactivate the enzymes.

B. *Concentration and further treatment of the juice*

The juice prepared as above described is then concentrated to form a liquid concentrate which is a desirable physical state of the material for application of the subsequent puff-drying procedure. A single-strength juice cannot be subjected directly to dehydration because it will boil and spatter violently and may not expand properly. On the other hand, when the concentrate is applied in dehydration it expands by entrapping steam bubbles and little boiling or spattering is obtained. In general the juice is concentrated as much as possible to still obtain a flowable liquid. Thus the subsequent dehydration step necessitates starting with a liquid concentrate but to decrease expense and time of dehydration as much moisture as possible should be removed during the concentration step to the point of obtaining a concentrate which is still capable of flowing. In many cases a satisfactory concentrate will have a density about from 35 to 80° Brix. The concentration is conducted under vacuum and at temperatures up to about 180° F. Preferably, the concentration is carried out under vacuum at about 50 to 100° F. in order to avoid heat damage to the tomato material and to avoid any impairment of its ability to perform properly in the subsequent puff-drying procedure. In the concentration procedure, as in the preceding steps, care should be taken not to subject the tomato material to cell-rupturing mechanical forces.

Thus the application of excessive pumping and the like, which may cause increase in the proportion of ruptured cells, should be avoided.

The concentrate may then be homogenized by passing it through a colloid mill or similar apparatus used for conducting homogenization. It has been observed in some instances that where the liquid concentrate is homogenized prior to concentration, the dried product exhibits particularly desirable rehydration properties. Thus when the product reconstituted there is formed a juice in which the pulp particles are more uniformly dispersed than is the case where the concentrate was not homogenized prior to dehydration. Also, homogenization causes a thickening of the liquid concentrate so that it is better enabled to entrap bubbles of gas during the subsequent dehydration operation. Although the step of homogenization is preferably employed, it is not a critical step and in most cases it may be omitted without adverse effect on the dehydration process or the character of the dehydrated product. Where homogenization is employed, the apparatus used should be one which is adapted to carry out this function without causing substantial rupture of cells. In cases where the proportion of whole cells in the liquid is below the optimum range, it is advisable to eliminate the homogenization step to avoid increasing the percentage of ruptured cells.

The concentrate is then preferably gasified, that is, air or a non-toxic inert gas such as nitrogen or carbon dioxide is incorporated into the concentrate. The gasification has the desirable effect of enhancing the expansion of the concentrate during vacuum dehydration. Thus when vacuum is applied the particles of gas dispersed throughout the body of the concentrate expand and so cause the entire mass of concentrate to expand thereby forming a porous mass many times the volume of the original concentrate. For the dispersion of gas into the concentrate many different types of apparatus may be used. A simple expedient is to subject the concentrate to a rotating wire whip which beats air into the concentrate. Another plan is to pump the concentrate through a conduit, a portion of which is of restricted cross-section to provide a venturi, the gas being introduced at the zone of high velocity and low pressure within the venturi and so thoroughly commingled and dispersed with the concentrate. Another plan is to place the concentrate in a sealed vessel and pump the gas under pressure through a perforated false bottom into the concentrate. A simple technique for adding air is to stir the concentrate with an agitator which periodically rises out of the level of liquid and in return to the liquid forces air into it and beats this air into the concentrate. Another system is to stir into the concentrate some of the dehydrated final product from a previous run. This product being in an expanded, porous condition comprises a matrix of solid material with numerous voids dispersed throughout the solid matrix. These voids being actually filled with air, stirring of the dehydrated material into the concentrate furnishes a simple and effective way of incorporating air. To reduce the size of the gas particles in the concentrate the concentrate after having the gas dispersed by use of agitators or the like may be passed through a colloid mill. If the latter technique is used then the concentrate need not be homogenized prior to gasification. In many cases, gasifying the concentrate to the extent of providing an overrun of about 10 to 50%, gives optimum results from the standpoint of causing adequate expansion during dehydration without forming a dried product of two low a bulk density. If products of lesser bulk density are desired, the overrun may be increased above the aforementioned levels as needed.

The concentrate is preferably cooled before or during the gasification step. Cooling is beneficial as it increases the consistency of the concentrate so that the gas particles can escape less readily from the mass. Also solubility of the gas in the concentrate is thus increased. In general, beneficial results are attained by cooling the concentrate to a temperature below room temperature but above the freezing temperature of the concentrate. Usually, a temperature level of about 40° F. is employed. Also, cooling of the concentrate is of benefit in the subsequent dehydration operation, particularly when a batch drying device is employed, as the cooled concentrate being of increased consistency is better able to entrap gas bubbles and thus produces a more voluminous and more stable froth when vacuum is applied in the dehydration procedure.

C. Dehydration of the juice concentrate

The dehydration (puff-drying) may be conducted in various types of apparatus suited for either batchwise or continuous operation. For illustrative purposes, the following description explains the procedure when using a batch-type vacuum shelf drier.

Trays containing the gasified concentrate are introduced into a vacuum drier equipped with hollow shelves through which heating or cooling media may be circulated. In loading the trays initially one must take into account the fact that the concentrate will expand considerably during drying. For this reason the level of concentrate in the trays must be low enough to allow for the 10- to 20-fold expansion without causing the expanded material to rise high enough to contact the shelf above each tray. After the trays are loaded into the drier, the drier is closed and the vacuum applied, the vacuum being maintained until dehydration is completed. Usually a pressure of about 1 to 10 mm. of Hg is used. Vacuums in this range are easy to obtain with relatively inexpensive equipment such as steam ejectors and require pumping of relatively small volumes of water vapor as compared with systems using vacuums on the order of several microns where very expensive efficient vacuum pumps, Dry Ice traps, etc. are essential. Preferably, during the initial stage of dehydration, no heat is supplied to the drier so that the initial temperature of dehydration is simply room temperature. During this stage of dehydration, the concentrate expands substantially in volume, in many cases the expanded volume may be anywhere from 10 to 20 times the original volume of the concentrate. Further, in this stage the concentrate becomes partly dehydrated, its temperature decreases due to the cooling effect of the evaporation of moisture, and the concentrate thickens in body, assuming a stiff plastic condition sufficient to retain its expanded form. In most cases, when the concentrate temperature falls below 32° F., the concentrate is in such condition that its expanded volume is permanently set and heat can be applied to accelerate evaporation of moisture without causing collapse of the expanded concentrate. Thus a convenient method for ascertaining the point when the concentrate is in the condition in which heat can be applied without causing collapse involves measurement of the temperature of the concentrate as the vacuum dehydration proceeds. In conducting the dehydration in a vacuum tray drier or similar device, usually this point is reached when the pressure within the drier has decreased to the low level desired for conducting the dehydration. At any rate when the point is reached when the concentrate can be heated without collapse, a heating medium is circulated through the hollow shelves of the drier. The temperature of the shelves may, in general, be held in the range from about 100° to 200° F. In any case, the temperature should not be increased to such a high level as to cause collapse of the expanded concentrate nor damage to the flavor and color of the material. The maximum temperature which can be tolerated with any particular concentrate can be easily determined by conducting a pilot run on a sample of the material in question. A preferred technique which has the advantages of obtaining rapid and efficient dehydration without collapse of the expanded state of the concentrate and without damage to the flavor and color of the concentrate involves applying heat at two different levels. Thus after the initial dehydration stage with no applied heat, the temperature of the shelves is raised to a relatively high level on the order of 150 to 200° F. to cause rapid evaporation of moisture. Then when the temperature of the concentrate approaches the range from about 100 to about 150° F., the temperature of the shelves is decreased to this same level and maintained at this level until the dehydration is completed. When proceeding according to this technique, dehydration is initially forced at a high rate by the application of a high temperature to the shelves. During this period the evaporative cooling effect is great so that the temperature of the concentrate remains well below the temperature of the shelves, hence no collapse nor flavor or color damage to the concentrate occurs despite the high temperature applied. However, as the dehydration proceeds, the rate of evaporation necessarily falls off with the result that the temperature of the concentrate starts to rise. When the temperature of the concentrate rises to a level of about 100 to 150° F., the shelf temperature is decreased to this same level so that further rise in the temperature of the concentrate is prevented. Thereby collapse of the expanded concentrate or damage to its color or flavor is prevented.

When the drying cycle is complete and the product has been reduced to the desired moisture content, usually about 5% moisture or less, the product is cooled to about room temperature before breaking the vacuum by circulating cold water through the drier shelves. This cooling causes the product to lose its plastic character and to become brittle and easily friable. As a consequence when the vacuum is released the cooled product maintains its expanded volume and is easy to remove from the trays and is easy to break up into small particles. Thus after the product is cooled, the vacuum is released, the drier is opened and the trays are removed. The dry product is then easily removed from the trays by applying a spatula to the trays; the action of the spatula causes the product to be broken up into a mass of fine crystalline flakes. For optimum results it is preferred that the vacuum drier be located in a room in which the atmosphere is regulated at a very low humidity; this will reduce any possibility of moisture regain by the product.

Instead of carrying out the dehydration in a batch-type of vacuum drier as described above, one may employ a continuous dehydrator such as a belt-type vacuum drier. A suitable apparatus of this type includes an endless flexible metallic belt which travels about two drums, one being heated internally by steam or hot water and the other being cooled by internal circulation of cold water. The belt, drums, and associated mechanisms are all located within an airtight vessel which can be evacuated. A film of the concentrate (with or without gasification) is applied to the outer surface of the belt by a roller device or other coating device. This film of concentrate undergoes expansion as it is deposited on the belt because of the vacuum existing within the dehydrator. The layer of expanded concentrate now in the form of a froth or foam is transported by the belt about the heated drum whereby dehydration occurs while the concentrate remains in an expanded condition. It is evident that in operating a continuous dehydrator of this type, the speed of the belt and the thickness of the film of concentrate should be so correlated that when the concentrate comes into thermal contact with the hot drum, sufficient evaporation has already taken place so that the expanded concentrate is thick enough to remain in its expanded condition. Usually the hot drum is maintained at a temperature of about 100° F. to about 212° F. Additional heaters in the way of radiant heaters or steam heated platens may be used to provide additional heating necessary to get complete dehydration of the concentrate. The dried concentrate is then transported by the belt about the cooled drum whereby the dried product is cooled to make it lose its plastic character. The cooled product is then scraped off the belt by a doctor blade and is removed from the dehydrator through an air-lock type of receiver.

It is often desirable to add sulphur dioxide or other sulphiting agent to the tomato liquid being dehydrated in order to stabilize the tomato material and prevent browning during processing and storage of the final product, particularly where the product is to be stored at elevated temperatures. It has also been found that addition of a sulphiting agent permits one to use a higher dehydrating product temperature (up to about 190° F.) without damage to the color or flavor of the tomato material. The use of a higher dehydrating temperature is of course desirable as the rate of dehydration is thereby accelerated. To this end, sulphur dioxide, sodium sulphite, or sodium bisulphite is added in such amount that the dehydrated product will contain about 50 to 500 p. p. m. of $SO_2$. A convenient point to add the sulphite or bisulphite is to the liquid concentrate prior to dehydration. If desired, ascorbic acid or organic fat-stabilizing antioxidants such as those listed in Strashun Patent No. 2,557,155 may be added to the final product or to the liquid at any stage in the process to prevent oxidation of flavoring or other oxidizable components.

The dry product which preferably contains not more than about 4% moisture, is packaged in tin cans or other containers which can be sealed to an air tight condition. It is obvious that since the product is virtually completely dehydrated it is not perishable and may be kept indefinitely at room temperature or higher. For reconstitution the calculated amount of water is poured onto the dehydrated product and after agitation for a few minutes the resulting tomato juice is ready to serve.

In packaging the dehydrated products it is often advantageous to insert in the sealed package a water vapor-permeable container holding a desiccant. The desiccant has the effect of removing the last traces of moisture from the dehydrated product whereby to increase its stability and shelf life. As the desiccant one may use such agents as calcium oxide, magnesium perchlorate, montmorillonite, silica gel, etc.

It is a feature of this invention that tomato juice can be dehydrated without the addition of any extraneous material or drying-aid or filler thus to produce a product which consists virtually of 100% natural tomato solids. However, if such an entirely natural product is not desired, one may incorporate in the concentrate prior to dehydration such materials as for example starch, sugar, egg solids, corn syrup, milk, or other nutritive or flavoring materials.

It is to be observed that it has been disclosed by Strashun and Talburt, patent application Serial No. 334,384, filed January 30, 1953, that tomato juice can be successfully puff-dried if the tomato juice is first treated to remove part of its natural pulp content and the depulped liquid fraction and the removed pulp are each dehydrated separately. This prior process gives the desired result but has the disadvantage that the pulp separation step and the step of recombining the dried liquid and dried pulp involve additional time and expense. Also the combined dehydrated product does not rehydrate readily nor does it form a homogeneous juice on reconstitution. In the process of the instant invention, none of the pulp naturally present in the tomato juice need be removed but the tomato juice is carried through the entire process with its natural pulp content retained in full. Thus the process of this invention is simpler and more economical than the prior process referred to above. Further, the dehydrated product in accordance with the present invention rehydrates readily and forms a reconstituted juice of homogeneous body.

It is to be observed that the puff-drying method of dehydration with which this invention is concerned is not to be confused with the known method of freeze-drying, that is, subjecting a material to vacuum while it is maintained in the frozen state. In freeze-drying, the dehydration involves sublimation, that is, direct conversion of ice to water vapor. In puff-drying, the material is not maintained in a frozen state but in a liquid to plastic state at above-freezing temperatures and this dehydration involves evaporation, that is, conversion of liquid water to water vapor. In the early stage of puff-drying, a small amount of sublimation may take place if the concentrate temperature falls to a low value but this is only a temporary condition and as soon as heat is applied the dehydration proceeds by evaporation from the liquid state. One of the main advantages of puff-drying over freeze-drying is that in the former the material undergoing dehydration expands to a considerable degree and maintains such expanded condition. As a result the product is in a light, expanded and porous condition so that it is easy to reconstitute. In freeze-drying expansion does not occur because the volume of the material is set by its solid (frozen) condition. Another disadvantage of freeze-drying is that sublimation from the solid state is a much slower process than evaporation from the liquid state and consequently freeze-drying requires much longer processing times than does puff-drying. A further point is that to obtain sublimation one must use very high vacuum, that is, pressures on the order of 10 to 100 microns of Hg. Apparatus for creating and maintaining such high vacuum is very expensive initially and costly to operate. On the other hand in puff-drying, a vacuum equivalent to a pressure of about 1 to 10 mm. of Hg is used. Vacuums in this range are easy to obtain with relatively inexpensive equipment such as steam ejectors and require pumping of relatively small volumes of water vapor as compared with systems using vacuums on the order of several microns where very expensive efficient vacuum pumps, Dry Ice traps, etc. are essential.

The invention is further demonstrated by the following examples. It is to be noted that operations outside the scope of the invention are described in Ex. I, part B. This information is included for comparative purposes as demonstrating the improved results obtained when employing the process of this invention.

EXAMPLE I

Raw tomatoes were chopped and passed through a conventional paddle-finisher and screen (using a light press) which separated the juice from the seeds, skins, and core particles. The resulting tomato juice was divided into two lots each being treated separately as follows:

A. The first lot of juice without any delay was pumped through a "Votator" heat exchanger whereby the temperature of the juice was brought up to 190° F. within a minute from the time the juice was passed through the seed and skin separating screen. The juice was held at 190° F. for about 12 seconds then rapidly cooled to room temperature in another "Votator" heat exchanger.

B. The second lot of juice was allowed to stand for 4 hours at room temperature then heated to 190° F. as in part A and quickly cooled to room temperature.

Both lots of heat-treated juice were then concentrated under vacuum at a maximum product temperature of 85° F. In the case of juice A, this juice could only be concentrated to 33° Brix because of greatly increasing thickness. The juice of lot B was concentrated to 42° Brix.

Both lots of concentrated juice were dehydrated in identical manner, as follows:

The concentrate was chilled to 37° F. then whipped to incorporate air into it. This aeration was continued until the material had a specific gravity of about 0.9.

The aerated concentrate was poured onto trays at a loading of about ½ lb. per sq. ft. The trays were placed on the shelves of a vacuum drier. The shelves were at about room temperature. The drier was closed and vacuum was applied. A vacuum of 1 mm. Hg was achieved and maintained throughout the dehydration. About 10 minutes after the vacuum had been attained, hot water at 120° F. was circulated through the hollow shelves of the drier. These conditions were continued until dehydration was completed. The shelves were then cooled by circulating cold water through them and the dehydrated product removed.

Both lots of concentrated juice dehydrated as above described were then examined and tested with the following results:

A. The product from the juice which had been subjected to immediate enzyme inactivation was found to be in an extensively expanded condition having a volume of about 10 times that of the concentrate applied to the dehydration. In addition, the product was fluffy and friable and could be easily removed from the trays and easily ground. On stirring the product with water for 5 minutes, a reconstituted tomato juice of homogeneous character and excellent natural taste was produced.

B. The product from the juice which had been subjected to standing before enzyme inactivation was found to exhibit little, if any, expansion. The product was dense and required hard scraping to get it off the trays. A sample of the product even after stirring for 30 minutes formed a reconstituted juice which contained gritty particles which settled quickly on standing.

EXAMPLE II

Raw tomatoes were chopped then immediately and continuously dropped into a tank containing tomato juice maintained at a temperature of about 190–200° F. The juice was continuously withdrawn from the tank and forced through screens to remove seeds and coarse particles. The juice was concentrated under vacuum at about 85° F. to make a concentrate of 40° Brix.

The concentrate was dehydrated in a continuous belt type of vacuum drier as hereinabove described. In carrying out the dehydration the concentrate was applied to the belt in the form of a film having a thickness of about 0.03″ and the belt speed was 12.5 ft. per minute. The belt carrying the film of concentrate was passed around a hot drum maintained at 212° F. to effect the dehydration. The dehydrated material was then carried by the belt about the cooling drum maintained at 60° F. The product had a moisture content of 1.6%. A vacuum of 3.5 mm. Hg was maintained throughout the dehydration. It was observed that the film of tomato juice concentrate expanded extensively during dehydration and produced a porous friable product which was readily removed from the dehydrator belt and which could be readily broken up into particles. On stirring with water for a few minutes the product formed a reconstituted juice of homogeneous character.

EXAMPLE III

Raw tomatoes were crushed and sieved (as in Example I) to separate the seeds and skins from the juice. The resulting juice was immediately subjected to heat treatment as described in Example I, part A. The heat-treated juice was then evaporated under vacuum to produce a concentrate of pasty consistency having a density of 38° Brix.

The tomato juice concentrate was then aerated by beating it with a power-rotated wire whip. The whipping was continued until the density of the concentrate was decreased to 0.9 gram/milliliter.

The aerated concentrate was poured onto trays at a loading of about ½ lb. per sq. ft. The trays were placed on the shelves of a vacuum drier. The shelves were at about room temperature at this time. The drier was closed and vacuum was applied. A vacuum of 1 mm. Hg was attained and maintained throughout the dehydration. After the dried had been exhausted, steam was circulated through the hollow shelves of the drier to raise their temperature to 220° F. As the dehydration proceeded, the shelf temperature was decreased to about 150° F. so that the product temperature did not rise above 150° F. The drying was complete in about 2.5 hours. At this time cold water was circulated through the hollow shelves of the drier. The vacuum was then released and the cool product was removed.

It was observed that the tomato juice concentrate expanded about 10 times in volume during the dehydration and this expanded condition was retained throughout the course of the dehydration process. As a result, the dehydrated product was a porous friable mass which was easy to remove from the trays and easy to break up into crystalline flakes. These flakes when stirred with water for a few minutes produced a reconstituted juice of excellent natural taste and homogeneous body.

Having thus described our invention, we claim:

1. A process of preparing dehydrated tomato juice in a solid, porous, friable, readily reconstitutable form which comprises: the preliminary steps, in any order, of (1) reducing raw tomatoes to a juice in the substantial absence of cell-rupturing mechanical forces whereby to obtain a juice the cellular portion of which is largely in the form of individual, whole, disconnected cells and (2) heating the tomato material to an enzyme-destroying temperature in the range from about 180 to about 220° F. before any chemical modification of its natural pectin content can occur and maintaining the tomato material at said temperature until the enzymes are inactivated; thereafter concentrating the juice to produce a liquid concentrate, and subjecting the liquid concentrate to conditions of heat and vacuum to cause it to be dehydrated and to maintain an extensively expanded volume throughout the dehydration.

2. A process of preparing dehydrated tomato juice in a solid, porous, friable, readily reconstitutable form which comprises reducing raw tomatoes to a juice in the substantial absence of cell-rupturing mechanical forces whereby to obtain a juice the cellular portion of which is largely in the form of individual, whole, disconnected cells, heating the tomato juice to an enzyme-destroying temperature in the range from about 180 to 220° F. before any chemical modification of its natural pectin content can occur, maintaining the tomato juice at said temperature until the enzymes are inactivated, concentrating the juice to produce a liquid concentrate, and subjecting the liquid concentrate to conditions of heat and vacuum to cause it to be dehydrated and to maintain an extensively expanded volume throughout the dehydration.

3. A process of preparing dehydrated tomato juice in a solid, porous, friable, readily reconstitutable form which comprises subjecting raw tomatoes to heat at an enzyme-destroying temperature in the range from about 180 to about 220° F. in the substantial absence of cell-rupturing mechanical forces to inactivate the enzyme content of the tomato material before any chemical modification of its natural pectin content can occur, maintaining the tomato material at said temperature until the enzymes are inactivated and the tomatoes are reduced to a juice the cellular portion of which is largely in the form of individual, whole, disconnected cells, concentrating the juice to produce a liquid concentrate, and subjecting the liquid concentrate to conditions of heat and vacuum to cause it to be dehydrated and to maintain an extensively expanded volume throughout the dehydration.

4. A process of preparing dehydrated tomato juice in a solid, porous, friable, readily reconstitutable form which comprises subjecting raw, fresh tomatoes to disintegration primarily by thermal action, at a temperature in the range from about 180 to about 220° F., in the substantial absence of cell-rupturing mechanical forces, maintaining the tomato material at said temperature for a period sufficient to inactivate the enzyme content of the tomatoes before any chemical modification of their natural pectin content can occur and to produce a tomato juice, the cellular portion of which is largely in the form of individual, whole, disconnected cells, concentrating said juice containing said cellular material to produce a liquid concentrate and subjecting the concentrate to conditions of heat and vacuum to cause it to be dehydrated and to maintain an extensively expanded volume throughout the dehydration.

5. A process of preparing dehydrated tomato juice in a solid, porous, expanded, friable, readily reconstitutable form which comprises subjecting raw fresh tomatoes to heat to cause the tomatoes to be formed into juice primarily by the action of heat, whereby the cellular portion of the juice is largely in the form of individual, whole, disconnected cells, and to cause inactivation of the enzyme content of the tomatoes before any chemical modification of their natural pectin content can occur, the heat being applied at such a rate that the tomatoes are brought up to a temperature level of about 180 to 212° F. in a period of time of not more than about one minute, concentrating the resulting juice to produce a liquid concentrate and subjecting the liquid concentrate to heat and vacuum to cause it to be dehydrated and to maintain an extensively expanded volume throughout the dehydration.

6. A process of preparing dehydrated tomato juice in a solid, porous, expanded, friable, readily reconstitutable form which comprises cutting raw tomatoes, immediately feeding the cut tomatoes into a vessel containing a large volume of tomato juice maintained at a temperature of about 180 to 212° F., whereby to cause the tomatoes to be formed into juice primarily by the action of heat, the cellular portion of the juice being largely in the form of individual, whole, disconnected cells, withdrawing juice from the vessel at such a rate that the introduced tomato material resides therein a period of time of about 1 to about 15 minutes, removing coarse particles from the juice, concentrating the juice to produce a liquid concentrate and subjecting the liquid concentrate to vacuum and heat within the range of about 100 to about 212° F. to cause it to be dehydrated while being maintained in an extensively expanded condition.

7. A process of preparing dehydrated tomato juice in a solid, porous, friable, readily reconstitutable form which comprises subjecting raw, fresh tomatoes to mechanical disintegration in the substantial absence of cell-rupturing mechanical forces, whereby to obtain a disintegrated tomato material the cellular portion of which is largely in the form of individual, whole, disconnected cells, immediately subjecting the disintegrated tomato material to heat to establish a temperature from about 180 to 220° F. throughout the mass of tomato material and maintaining the tomato material at said temperature for a period sufficient to inactivate the enzyme content of the tomatoes before any substantial chemical modification of their natural pectin content can occur, concentrating the resulting tomato juice to produce a liquid concentrate, and subjecting the liquid concentrate to heat and vacuum to cause it to be dehydrated and to maintain an extensively expanded volume throughout the dehydration.

8. A process of preparing dehydrated tomato juice in a solid, porous, expanded, friable, readily reconstitutable form which comprises subjecting raw, fresh tomatoes to mechanical disintegration in the substantial absence of cell-rupting mechanical forces, whereby to obtain a juice the cellular portion of which is largely in the form of individual, whole, disconnected cells, immediately separating the tomato juice from the resulting macerate, immediately subjecting the tomato juice containing its full, natural proportion of pulp to heating at a rapid rate so that every particle of the juice is brought to a temperature in the range from about 180 to about 220° F. within a period of not more than 30 seconds from the moment of disintegration, holding the tomato juice at the aforesaid temperature range for a sufficient period of time, within the range from about 5 seconds to about 5 minutes, to ensure complete enzyme inactivation, concentrating the resulting juice to produce a liquid concentrate and subjecting the liquid concentrate to vacuum and heat within the range of about 100 to 212° F. to cause it to be dehydrated while being maintained in an extensively expanded condition.

References Cited in the file of this patent

UNITED STATES PATENTS 2,092,729  Eberts ------------------ Sept. 7, 1937

OTHER REFERENCES

Textbook: Fruit and Vegetable Juice Production by Tressler et al., 1954, pp. 700 and 904.

"Food Technology," March 1955, pp. 121 to 123.